(12) United States Patent
Charleux et al.

(10) Patent No.: US 9,784,217 B2
(45) Date of Patent: Oct. 10, 2017

(54) LOW-THICKNESS THERMOSTRUCTURAL COMPOSITE MATERIAL PART, AND MANUFACTURE METHOD

(71) Applicant: HERAKLES, Le Haillan (FR)

(72) Inventors: François Charleux, Bordeaux (FR); Dominique Coupe, Le Haillan (FR); Eric Philippe, Merignac (FR)

(73) Assignee: HERAKLES, Le Haillan (FR)

( * ) Notice: Subject to any disclaimer, the term of this patent is extended or adjusted under 35 U.S.C. 154(b) by 0 days.

(21) Appl. No.: 15/062,646

(22) Filed: Mar. 7, 2016

(65) Prior Publication Data

US 2016/0186691 A1 Jun. 30, 2016

Related U.S. Application Data

(62) Division of application No. 13/504,727, filed as application No. PCT/FR2010/052285 on Oct. 26, 2010, now Pat. No. 9,309,159.

(30) Foreign Application Priority Data

Oct. 30, 2009 (FR) ..................................... 09 57676

(51) Int. Cl.
*F02K 9/97* (2006.01)
*C04B 35/52* (2006.01)
(Continued)

(52) U.S. Cl.
CPC .............. *F02K 9/97* (2013.01); *C04B 35/52* (2013.01); *C04B 35/565* (2013.01);
(Continued)

(58) Field of Classification Search
CPC .......................................................... F02K 9/97
(Continued)

(56) References Cited

U.S. PATENT DOCUMENTS 4,932,107 A 6/1990 Gotoh et al.
5,071,679 A 12/1991 Heraud et al.
(Continued)

FOREIGN PATENT DOCUMENTS

EP 0 302 449 A2 2/1989
EP 0 441 700 B1 6/1997
(Continued)

OTHER PUBLICATIONS

WO2008/104692, machine translation, 2008.*
(Continued)

*Primary Examiner* — Robert Vetere
(74) *Attorney, Agent, or Firm* — Pillsbury Winthrop Shaw Pittman LLP

(57) ABSTRACT

A thermostructural composite material part including carbon or ceramic fiber reinforcement densified by a matrix having at least one thin portion in which: the thickness of the part is less than 2 mm, or indeed less than 1 mm; the fiber reinforcement is made as a single thickness of multilayer fabric made of spread yarns having a weight of not less than 200 tex; the fiber volume ratio lies in the range 25% to 45%; and the ratio between the number of layers of the multilayer fabric and the thickness in millimeters of the part is not less than four.

7 Claims, 2 Drawing Sheets

(51) Int. Cl.
*C04B 35/565* (2006.01)
*C04B 35/628* (2006.01)
*C04B 35/80* (2006.01)
*D06C 29/00* (2006.01)
*F02K 1/82* (2006.01)

(52) U.S. Cl.
CPC .. *C04B 35/62868* (2013.01); *C04B 35/62873* (2013.01); *C04B 35/62884* (2013.01); *C04B 35/62897* (2013.01); *C04B 35/80* (2013.01); *C04B 35/806* (2013.01); *D06C 29/00* (2013.01); *F02K 1/82* (2013.01); *C04B 2235/483* (2013.01); *C04B 2235/5216* (2013.01); *C04B 2235/5244* (2013.01); *C04B 2235/5248* (2013.01); *C04B 2235/5256* (2013.01); *C04B 2235/5268* (2013.01); *C04B 2235/614* (2013.01); *C04B 2235/616* (2013.01); *C04B 2235/95* (2013.01); *F05D 2220/80* (2013.01); *F05D 2240/128* (2013.01); *F05D 2300/603* (2013.01); *F05D 2300/6012* (2013.01); *F05D 2300/6033* (2013.01); *Y10T 428/2495* (2015.01)

(58) Field of Classification Search
IPC .......................................................... F02K 9/97
See application file for complete search history.

(56) References Cited

U.S. PATENT DOCUMENTS

| | | | |
|---|---|---|---|
| 5,246,736 A | 9/1993 | Goujard et al. | |
| 5,557,831 A | 9/1996 | Kishi et al. | |
| 5,732,748 A * | 3/1998 | Aucagne | D03D 3/00 100/210 |
| 5,965,266 A | 10/1999 | Goujard et al. | |
| 6,068,730 A | 5/2000 | Ramm-Schmidt et al. | |
| 6,217,997 B1 | 4/2001 | Suyama et al. | |
| 6,291,058 B1 | 9/2001 | Goujard et al. | |
| 2010/0005780 A1 | 1/2010 | Philippe et al. | |

FOREIGN PATENT DOCUMENTS

| | | |
|---|---|---|
| EP | 2 154 119 A1 | 2/2010 |
| FR | 2 401 888 | 3/1979 |
| FR | 2 902 802 | 12/2007 |
| WO | WO 94/12708 | 6/1994 |
| WO | WO 96/41046 | 12/1996 |
| WO | WO 2005/095689 | 10/2005 |
| WO | WO 2006/136755 A2 | 12/2006 |
| WO | WO 2007/148019 A1 | 12/2007 |
| WO | WO 2008/104692 A2 | 9/2008 |
| WO | WO 2010/007308 A1 | 1/2010 |
| WO | WO 2010/061139 A2 | 6/2010 |
| WO | WO 2010/061140 A1 | 6/2010 |

OTHER PUBLICATIONS

International Search Report as issued for PCT/FR2010/052285 dated Feb. 4, 2011.

Ube, Tyrranno ZMI Data Sheet, 2009.

* cited by examiner

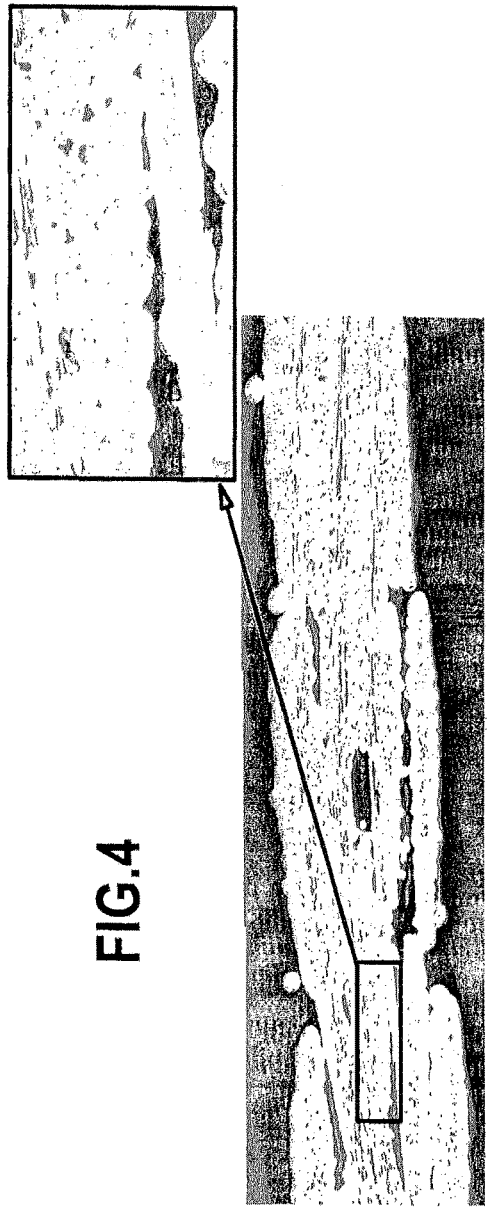
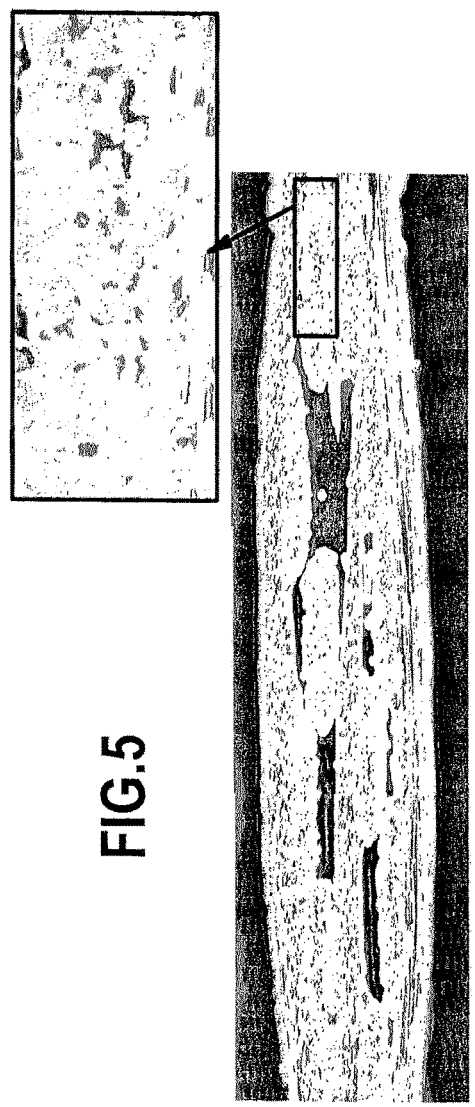

LOW-THICKNESS THERMOSTRUCTURAL COMPOSITE MATERIAL PART, AND MANUFACTURE METHOD

CROSS REFERENCE TO RELATED APPLICATIONS

This application is a divisional of U.S. application Ser. No. 13/504,727, filed on Aug. 8, 2012, which is the U.S. National Stage of PCT/FR2010/052285, filed Oct. 26, 2010, which in turn claims priority to French Patent Application No. 0957676, filed Oct. 30, 2009, the entire contents of all applications are incorporated herein by reference in their entireties.

BACKGROUND OF THE INVENTION

The invention relates to thermostructural composite material parts, and more precisely to such parts in which there is at least a portion that is of small thickness, i.e. of thickness less than 2 millimeters (mm).

The invention applies more particularly to structural parts for aviation and space applications, in particular afterbody parts for gas turbine aeroengines, nozzle exhaust cones, . . . .

For such parts, proposals have been made to use thermostructural composite materials, i.e. composite materials having mechanical properties that make them suitable for constituting structural elements and that have the ability to conserve those properties at high temperatures. Such thermostructural materials are constituted in particular by carbon/carbon (C/C) composite materials (carbon fiber reinforcement and carbon matrix), and by ceramic matrix composite (CMC) materials, e.g. C/SiC materials (carbon fiber reinforcement with a silicon carbide matrix), C/C—SiC materials (carbon fiber reinforcement with a mixed carbon and silicon carbide matrix), or indeed SiC/SiC materials.

The fabrication of a C/C or a CMC material part usually comprises making a fiber preform having a shape that corresponds to the shape of the part that is to be obtained and that is to constitute the fiber reinforcement of the composite material, and then densifying the fiber preform with the matrix of the composite material.

In order to give the composite material the desired mechanical properties, while leaving sufficient access to its pores to enable it to be densified with a matrix, the fiber volume ratio, i.e. the percentage of the volume of the part or of the apparent volume of the fiber reinforcement that is occupied by the fibers, generally lies in the range 25% to 45%.

The fiber preform may be obtained by draping fiber plies, e.g. plies of fabric or sheets of unidirectional or multidirectional yarns, it being possible to superpose a plurality of plies and bond them together, e.g. by needling. The fiber preform may also be obtained from a fiber structure that is obtained by three-dimensional (3D) weaving or by multilayer weaving (a plurality of warp yarn layers linked together by weft yarns).

The fiber preform may be densified with a carbon or ceramic matrix by using a liquid technique or by chemical vapor infiltration (CVI). Densification by a liquid technique comprises impregnating the fiber preform with a liquid composition containing a resin that is a precursor of carbon or ceramic, and then polymerizing and pyrolyzing the resin in order to obtain a carbon or ceramic residue, with a plurality of consecutive impregnation, polymerization, and pyrolysis cycles possibly being performed. CVI densification is performed by placing the fiber preform in an enclosure and admitting a reaction gas into the enclosure under determined conditions in particular of pressure and temperature so that the gas diffuses into the preform and enables a deposit of the matrix material to be obtained as a result of one or more ingredients of the gas decomposing or as a result of a reaction between a plurality of its ingredients. For parts of special shapes, in particular of complex shapes, an initial step of consolidation by a liquid technique may be performed while using suitable tooling for holding the fiber preform in the desired shape, with densification then being continued without the aid of tooling, e.g. by CVI.

The above techniques are well known and have already been proposed for making parts for aviation and space applications that are exposed in operation to high temperatures, in particular turbine blades of aeroengines, afterbody portions of aeroengines such as secondary nozzles, mixers for bypass turbines, exhaust cones or nozzle flaps, and nozzles for rocket engines. Reference may be made in particular to the following documents in the name of the Applicant: WO 2010/007308, WO 2010/061139, WO 2010/061140, and WO 2008/104692.

When a part or a portion of a part is thin there is a problem of making a fiber preform that is suitable for obtaining the properties that are desired for the part that is to be fabricated.

The known technique that consists in forming a fiber preform by needling together superposed layers is hardly suitable since in order to obtain a fiber preform that is thin and that has uniform characteristics, it is necessary to begin by making a fiber structure of much greater thickness and then make use of its central portion only, thereby giving rise to large losses of material.

The known technique that consists in forming a fiber preform by a multilayer woven structure also presents drawbacks. Even when using carbon or ceramic yarns of the smallest commercially-available weight, the making of thin parts requires a reduction in the number of layers in a multilayer fabric, e.g. only two layers for a thickness of 0.75 mm, as shown in document WO 2008/104692, and that can affect the mechanical strength of the part. In addition, multilayer weaving produces a surface state that is irregular and produces an association of micropores (within the yarns) and macropores (between the yarns). For parts that are intended for aviation and space applications, such as for example stream mixers or nozzles, it is preferable to obtain a surface state that is smooth in order to avoid disturbing the fluid flow. The use of a preform with a surface state that is highly irregular gives rise, even after densification, to a part that presents significant surface relief. It is indeed possible to perform surface machining to improve that situation, however that leads to fibers being destroyed or laid bare, which is undesirable. In addition, the existence of macropores makes it inevitable that there will be residual irregular porosity after densification.

Document WO 94/12708 discloses a two-dimensional warp and weft fabric that is suitable for making reinforcing textures for composite material parts, the fabric being subjected to an operation in which the yarns making it up are spread apart by vibration in order to increase the fiber volume ratio. Spreading a two-dimensional fabric by vibration in order to eliminate holes in the fabric and thus increase the fiber volume ratio is also described in document EP 0 302 449.

OBJECT AND SUMMARY OF THE INVENTION

An object of the invention is to provide a thermostructural composite material part which is suitable for the above-mentioned applications, while ensuring that at least a portion of the part presents a thickness that is small, and which has a fiber reinforcement that is obtained by multilayer weaving, which weaving makes use of a relatively large number of layers, including in the portion of small thickness.

This object is achieved by a part wherein, in at least a portion of the part:
- the thickness of the part is less than 2 mm;
- the fiber reinforcement is constituted by a single thickness of multilayer fabric made up of spread yarns weighing at least 200 tex;
- the fiber volume ratio lies in the range 25% to 45%; and
- the ratio between the number of layers of the multilayer fabric and the thickness in millimeters of the part is not less than four.

In said portion of the part, the thickness may even be less than 1 mm.

Preferably, the number of layers of the yarns in the fabric is not less than three. The term "number of layers" is used herein to mean the number of layers of warp yarns.

The multilayer fabric may have a multi-plain, multi-serge, or multi-satin type weave.

The matrix may be made at least in part out of ceramic, in particular when the part constitutes an afterbody part for a gas turbine aeroengine.

In another particular application, the part constitutes at least a portion of a rocket engine exhaust cone, in which the matrix may be made of carbon or of ceramic.

The invention also provides a method of obtaining such a part, the method comprising making a carbon or ceramic fiber preform and densifying the preform with a matrix, in which method, in order to make at least a portion of the preform that has a thickness of less than 2 mm, the following steps are performed:
- making a multilayer fabric having yarns weighing not less than 200 tex;
- subjecting the fabric to an operation of spreading the yarns so as to reduce the thickness of the multilayer fabric; and
- making said preform portion from the spread multilayer fabric, the thickness of said preform portion being constituted by a single thickness of spread fabric presenting a ratio between the number of layers of the fabric and the thickness in millimeters of said preform portion of not less than four;
- the thread count of the multilayer fabric during weaving being selected so as to obtain a volume fiber ratio lying in the range 25% to 45% in the fiber preform.

Preferably, the number of layers of the multilayer fabric is not less than three.

The multilayer weaving is preferably performed with a multi-plain, multi-serge, or multi-satin type weave.

The invention is remarkable in that by spreading the yarns of the multilayer fabric, it is possible to produce a fiber preform of small thickness that enables thin parts or portions of parts to be made out of composite material, i.e. having a thickness of less than 2 mm or even less than 1 mm, while preserving the presence of layers of yarns in sufficient number to obtain good mechanical properties.

The intended object is not to have a fiber preform with a fiber volume ratio that is greater than in the prior art. When making the fiber preform, it is therefore necessary to adapt the thread count of the multilayer fabric in order to have a desired fiber volume ratio after spreading.

Spreading the yarns of the multilayer fabric is also advantageous in that it makes it possible to reduce the macroporosity of the multilayer fabric (spacing between yarns), which is favorable for densifying the preform.

Another advantage that is obtained is a reduction in the surface relief of the multilayer fabric, thereby making it possible on the resulting part to obtain an improved surface state for an application in the field of aviation.

BRIEF DESCRIPTION OF THE DRAWINGS

The invention can be better understood on reading the following description given by way of non-limiting indication with reference to the accompanying drawings, in which:

FIGS. 4 and 5 are views taken with an optical microscope showing sections of thin parts of composite material obtained by a method of the invention and by a method of the prior art.

DESCRIPTION OF PARTICULAR EMBODIMENTS

Figure 1:
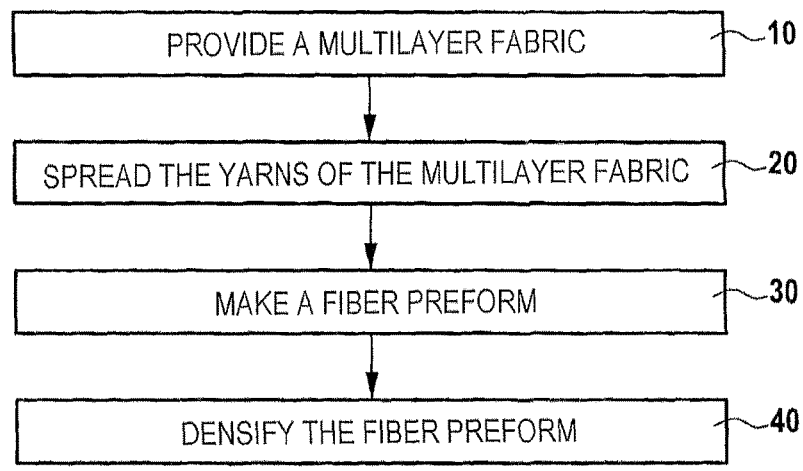
FIG. 1 shows the steps of fabricating a composite material part in an embodiment of the invention.

A method of fabricating a thermostructural composite material part is described below with reference to FIG. 1, the part that is to be fabricated in this example being a thin part of substantially uniform thickness.

A first step 10 of the method consists in providing a multilayer fabric. The fabric is made with carbon or ceramic yarns. Advantageously, use is made of commercially-available yarns having a weight of not less than 200 tex. Multilayer or three-dimensional weaving consists in linking together layers of warp yarns by means of weft yarns, at least some of which take hold of warp yarns belonging to different layers. The number of layers of yarns is preferably not less than three. Advantageously, weaving is performed with a multi-plain, multi-serge, or multi-satin type weave. Other weaves may be envisaged, such as an interlock type weave. Reference may be made to document WO 2006/136755, the content of which is incorporated herein by reference, that document describing various types of multilayer weaves.

A second step 20 of the method consists in spreading the yarns of the multilayer fabric so as to reduce the thickness of the fabric. The spreading may be performed by subjecting the fabric to the action of a jet of fluid or to mechanical vibration. Processes are known for spreading yarns in a conventional two-dimensional fabric. Reference may be made in particular to documents WO 2005/095689, WO 96/41046, U.S. Pat. No. 5,557,831, and above-mentioned document WO 94/12708. In order to encourage spreading, it is preferable to weave yarns that are made up of filaments with practically no twist. Spreading makes it possible to bring the thickness of the fabric, after spreading, to a value that is less than 85% of the initial thickness of the fabric before spreading, e.g. to a thickness lying in the range 70% to 85% of the initial thickness.

A fiber preform of a shape corresponding to that of the part that is to be fabricated is subsequently made (step 30) by means of the spread fabric. It is possible to use a single ply of spread fabric or a plurality of plies arranged side by side and joined together along their adjacent edges, e.g. by stitching. Under all circumstances, the thickness of the fiber preform is constituted by a single thickness of fabric. Making the fiber preform may include a step of shaping by means of tooling such as a shaper or a jig. During shaping, compacting may be performed by applying compression, e.g. between a mold and a counter-mold, or between a shape and a diaphragm.

The fiber preform obtained after compacting, if any, has a thickness of less than 2 mm, or indeed less than 1 mm, and presents a fiber ratio lying in the range 25% to 45%, where the fiber ratio is the percentage of the apparent volume of the preform that is actually occupied by the fibers of the yarns, the remainder of the volume being constituted by the pores within the spread yarns and between the yarns.

The ratio between the number of layers of fabric forming the preform and the thickness of the fiber preform in millimeters is not less than four.

Thus, for a desired fiber preform thickness e, and depending on the weights of the available yarns, a number n is selected for the layers of the multilayer fabric such that $n \geq 4e$ and such that $n \leq n_{max}$, where $n_{max}$ is the maximum number of layers that enable the desired thickness to be obtained after the yarns have been maximally spread and after compacting of the preform, if any.

Table I below gives two examples of thin preforms being obtained from ceramic (SiC) yarns, these examples being described in greater detail further below. The thread count is expressed as the number of warp yarns per centimeter in the weft direction in each layer of warp yarns, and as a number of weft yarns per centimeter in the warp direction, in each layer of weft yarns. The spreading value given is the mean value for variation in the width of warp and weft yarns at the surface of the multilayer fabric after the yarns have been spread, this variation being expressed as a percentage of the width of the yarns of the fiber before spreading. The thickness of the spread fabric is measured under a load of 5 kilopascals (kPa), i.e. between two plates with a pressure of 5 kPa being applied.

TABLE I

| | | Example | | |
|---|---|---|---|---|
| | | 1 | | 2 |
| Nature of yarns | | SiC | | SiC |
| Weight of yarns (tex) | | 200 | | 200 |
| Weaving | Weave | multi-serge | | multi-plain |
| | Number n of layers | 5 | | 10 |
| | Thread count | 5    5 | | 2.5    2.5 |
| Mean yarn spreading (%) | | 31% | | 73% |
| Preform | Thickness e (mm) | 1.3 | | 1.37 |
| | Fiber ratio (%) | 33% | | 31% |
| | n/e ratio | 3.8 | | 7.3 |

In Example 1, the condition n/e 4 is satisfied by greater compacting while shaping the spread fabric.

Loading the preform produces compacting that gives rise to a reduction in thickness but that increases the fiber ratio. The weaving thread count must therefore be selected accordingly so as to achieve the desired fiber ratio at the level of compacting that corresponds to the desired thickness. Thus, in Example 2, the thread count is half that of Example 1 both in the warp direction and in the weft direction.

The fiber preform is densified (step 40) by a carbon matrix or by a matrix that is at least partially made of ceramic in order to obtain the desired thermostructural composite material part. Densification may be performed using a liquid technique or by CVI as mentioned in the introductory portion of the description, these processes being themselves well known. When the matrix is at least partially ceramic, it may include at least one self-healing ceramic phase, i.e. a phase that is capable of healing cracks in the matrix by taking on a pasty state in a certain temperature range. The making of potentially self-healing ceramic matrices is described in particular in the following documents: FR 2 401 888, U.S. Pat. No. 5,246,736, U.S. Pat. No. 5,965,266, U.S. Pat. No. 6,068,730, and U.S. Pat. No. 6,291,058.

In known manner, densification may comprise a first stage of consolidating the preform, thereby enabling it to conserve its shape without help from supporting tooling. Consolidation is performed by partial densification of the preform held in tooling, which partial densification may be obtained by using a liquid technique or by CVI, with densification subsequently being continued without the tooling.

Also in known manner, an embrittlement-relief interphase layer may be deposited on the fibers of the fiber preform. Such an interphase layer, typically made of pyrolytic carbon (PyC), boron nitride (BN), or boron-doped carbon (BC with 5 at % to 20 at % of B, the balance being C) may be formed on the fibers by CVI before or after shaping the preform.

Finally, still in known manner, fiber treatment may be performed before possible deposition of an interphase layer, possible consolidation, and densification. Such treatment may be performed at the preform or multilayer fabric stage or indeed on the yarns before weaving. With carbon yarns, the treatment may consist in heat treatment at a temperature in the range 1300° C. to 2200° C., as described in document EP 0 441 700, while with ceramic yarns, the treatment may consist in acid treatment as described in document U.S. Pat. No. 5,071,679.

For consolidation by means of a ceramic phase obtained by a liquid technique, it should be observed that it is desirable prior to consolidation for the fibers of the preform to be provided with a first thin interphase layer. A second interphase layer is then formed after consolidation. Reference may be made to document EP 09 165 172.9.

After densification, a thermostructural composite material part is obtained that, like the preform, presents thickness of less than 2 mm, or indeed less than 1 mm.

The invention is also applicable when a thermostructural composite material part that is to be made needs to present small thickness, less then 2 mm, in only a portion of the part.

Under such circumstances, in a first possibility, a preform portion is made separately presenting a thickness of less than 2 mm by using a multilayer fabric and spreading the yarns of the fabric as described above. The or each other portion of the preform is made in the form of a fiber texture that may be obtained in any desirable manner, not necessarily by multilayer weaving. The portions of the preform are assembled together, e.g. by stitching, in order to obtain the desired preform.

According to another possibility, the fiber preform is made integrally from a multilayer fabric that is woven while increasing the number of layers of warp yarns and of weft yarns that are woven in the or each portion of greater thickness. The yarns of the multilayer fabric may be spread solely in the thin portion of the fabric, e.g. under the action of a jet of fluid, or else throughout the fabric.

Example 1 (of the Invention)

A thin plate of CMC material was made as follows.

A multilayer fabric having a two-up two-down multi-serge type weave was made with SiC yarns weighing 200 tex as supplied under the name "Nicalon" by the Japanese supplier Nippon Carbon. The warp and weft thread counts were 5×5 (five warp yarns per centimeter in the weft direction in each layer of warp yarns and five weft yarns per centimeter in the warp direction in each layer of weft yarns). The number of layers was equal to five, i.e. five layers C1 to C5 of warp yarns and five layers of weft yarns T1 to T5.

Figure 2:
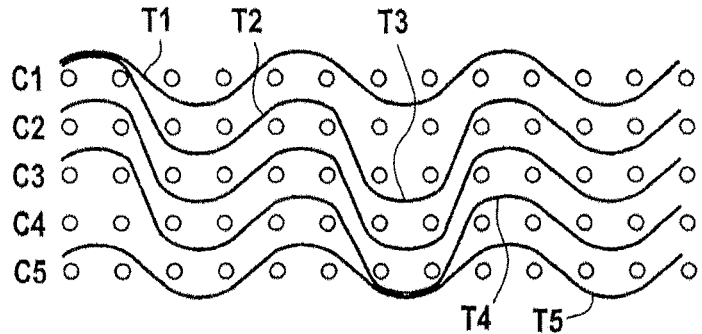
FIG. 2 is a weave plan for a multi-serge type multilayer fabric.

FIG. 2 shows a first weft plane (the warp yarns being in section), and the other weft planes can be deduced therefrom by successive one-step shifts in the weft direction between the columns of warp yarns. The yarns T1 and T5 link the yarns of the surface warp layers C1 and C5 in a conventional serge weave (two-dimensional weaving). The yarn T2 links together warp yarns of the layers C1, C2, C3, while the yarn T3 links together warp yarns of the layers C2, C3, C4, and the yarn T4 link together warp yarns of the layers C3, C4, and C5.

This produced a multilayer fabric having a thickness equal to about 1.7 mm under a load of 5 kPa.

The yarns of the fabric were spread by subjecting the fabric to vibration so as to reduce its thickness to a value equal to about 1.3 mm under a load of 5 kPa. The fiber volume ratio was about 33%.

A plate of CMC material was then obtained by a method such as that described in above-mentioned document EP 09 165 172.9.

Thus, after using CVI to form a first PyC interphase layer having a thickness approximately equal to 50 nanometers (nm) on the fibers of the fabric, the fabric was impregnated with a ceramic-precursor polysiloxane resin in solution in methyl-ethyl-ketone. After drying, the resin was cured while the fabric was held in the desired shape by means of tooling, its thickness being reduced to about 1 mm by compacting. The fiber preform as consolidated in that way was removed from the tooling and placed in a CVI oven in which the resin was pyrolyzed, prior to continuing with CVI formation of a second PyC interphase layer having thickness approximately equal to 200 nm covering the first interphase layer and the grains of the pyrolysis residue of the resin, and then with CVI densification by means of a ceramic matrix of the silicon-boron-carbon (Si—B—C) type, as described in above-mentioned document U.S. Pat. No. 5,246,736.

A CMC material plate was obtained having a thickness of approximately 1 mm, comprising multilayer woven fiber reinforcement with five layers of warp yarns and five layers of weft yarns.

Comparative Example 1 (According to the Prior Art)

Figure 3:
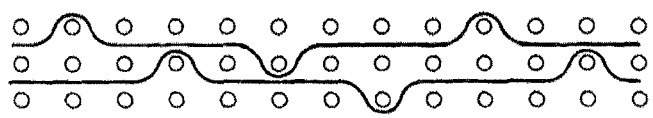
FIG. 3 is a weave plan for a multi-satin type multilayer fabric.

A multilayer fabric was made using the same yarns as in Example 1. In order to limit the thickness of the fabric to about 1 mm, weaving was performed using three layers of warp yarns and two layers of weft yarns, so the number of layers in the fabric was equal to three. A multi-satin type weave was used with a weft plane as shown in FIG. 3, the other weft planes being deduced therefrom by successive shifts in the weft direction. The fiber ratio of the multilayer fabric was about 40%.

A plate of CMC composite material was obtained from the multilayer fabric (without spreading the yarns), as described in Example 1.

FIGS. 4 and 5 are section views of parts obtained in accordance with Example 1 and in accordance with Comparative Example 1, respectively. It can be seen that the invention enables macropores within the composite material to be reduced. At equal fiber ratios, the fractioning of the pores in the fiber preform as a result of yarn spreading makes it possible to achieve such a result. This is in addition to the fact that for given thickness, a composite material with fiber reinforcement having a larger number of layers of yarns was obtained. Furthermore, although Example 2 shows a technological limit of prior art methods in terms of thickness, the method of the invention makes it possible to achieve parts having thicknesses of less than 1 mm, while still having a satisfactory number of layers of yarns in the multilayer fabric forming the fiber reinforcement of the part. Furthermore, spreading the yarns of the multilayer fabric reduces surface irregularities.

Example 2 (of the Invention)

A multilayer fabric having a multi-plain type weave was made using the same yarns as in Example 1. The thread count in the warp and weft directions was 2.5×2.5. The number of layers was ten, i.e. ten layers C'1 to C'10 of warp yarns and ten layers of weft yarns T'1 to T'10.

Figure 6:
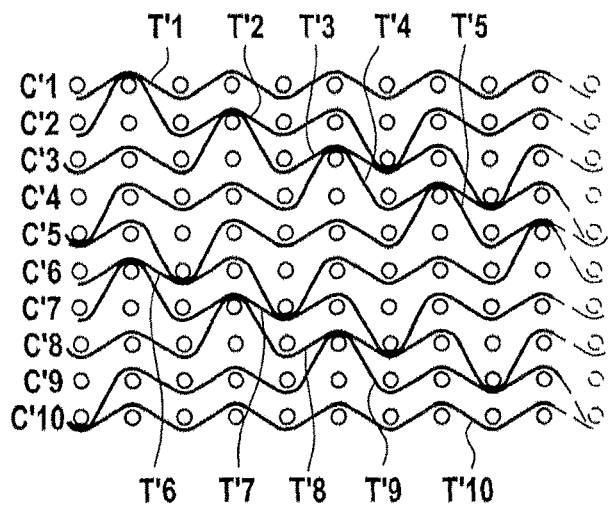
FIG. 6 shows a weave plan for a multi-plain type multilayer fabric.

FIG. 6 shows a first weft plane, the other weft planes being deduced therefrom by successive shifts in the weft direction. The yarns T'1 and T'10 link the yarns of the surface warp layers C'1 and C'10 in a conventional plain weave. The other weft yarns T'2 to T'9 link together warp yarns in sets of three adjacent layers, e.g. the yarn T'2 links together the warp yarns in layers C'1, C'2, and C'3.

This produced a multilayer fabric having thickness equal to about 1.6 mm under a load of 5 kPa.

The yarns of the fabric were spread by subjecting the fabric to vibration until its thickness was reduced to a value equal to about 1.37 mm under a load of 5 kPa. The fiber volume ratio was about 31%.

Weaves other than multi-serge and multi-plain could be used for implementing the method, e.g. interlock and multi-satin weaves.

The invention claimed is:

1. A part made of thermostructural composite material comprising carbon or ceramic fiber reinforcement densified by a matrix, wherein, in at least a portion of the part:
   the thickness of the part is less than 2 mm;
   the fiber reinforcement is constituted by a single thickness of multilayer fabric made up of spread yarns weighing at least 200 tex;
   the fiber reinforcement having a total multilayer thickness of less than 2 mm;
   the fiber volume ratio lies in the range 25% to 45%; and
   the ratio between the number of layers of warp yarns of the multilayer fabric and the thickness in millimeters of the part is not less than four.

2. A part according to claim 1, wherein, in at least said portion of the part, the part has a thickness of less than 1 mm.

3. A part according to claim 1, wherein the number of layers of warp yarns of the multilayer fabric is not less than three.

4. A part according to claim 1, wherein the multilayer fabric has a multi-plain, multi-serge, or multi-satin type weave.

5. A part according to claim 1, wherein the matrix is made at least partially of ceramic.

6. A part according to claim 5, constituting an afterbody part of a gas turbine aeroengine.

7. A part according to claim 1, constituting at least a portion of a rocket engine nozzle exhaust cone.

* * * * *